No. 886,746. PATENTED MAY 5, 1908.
E. WALTER.
MIRROR ATTACHMENT FOR TABLE IMPLEMENTS.
APPLICATION FILED OCT. 18, 1907.

Inventor
Elmer WALTER,

Witnesses
A. H. Rabsag,
O. H. Butler

By H. C. Everitt Co.
Attorneys

UNITED STATES PATENT OFFICE.

ELMER WALTER, OF HARRISBURG, PENNSYLVANIA.

MIRROR ATTACHMENT FOR TABLE IMPLEMENTS.

No. 886,746.　　　　Specification of Letters Patent.　　　Patented May 5, 1908.

Application filed October 18, 1907. Serial No. 398,115.

*To all whom it may concern:*

Be it known that I, ELMER WALTER, a citizen of the United States of America, residing at Harrisburg, in the county of Dauphin and State of Pennsylvania, have invented certain new and useful Improvements in Mirror Attachments for Table Implements, of which the following is a specification, reference being had therein to the accompanying drawing.

This invention relates to certain new and useful improvements in mirror for table implements, and the primary object of the invention is to provide a table implement, such as a knife, fork, or other device with a mirror suitably secured in the handle of the implement, so that the user of the implement may have ready at hand a mirror for the purpose of inspecting the teeth in the mouth or the mouth or other portions of the face generally, at any time desired by the user of the implement.

The invention is particularly designed for use in connection with such table implements as are used in restaurants, cafés, or other public eating establishments. Often times a patron of a restaurant or café finds the need of a mirror to discover a substance which has become lodged in the teeth, or for the purpose of determining whether the lips be entirely clean after eating certain foods, or for other similar purposes. It is not only inconvenient, but embarrassing often times as well, for such patron to ask for a mirror to be used at the table. In my device, however, the mirror being in the implement used by the patron during eating, may be used by him or her for the purpose indicated above substantially without attracting any attention, and is always ready for such use at any time desired.

The invention is, as above stated designed for use in connection with table implements, and I do not herein claim or desire to be understood as claiming the broad application of a mirror to any implement, my invention residing in the employment of a mirror affixed to a table implement, preferably in the handle thereof, in which position it is suitably held against displacement, and is so affixed in the handle as to prevent any injury to the backing of the mirror by the washing of the implement, or the loosening of the mirror from its position in such implement.

In describing the invention in detail, reference will be had to the accompanying drawings forming a part of this application, and wherein like numerals of reference will be employed to indicate like parts throughout the several views, in which:—

Figure 1:
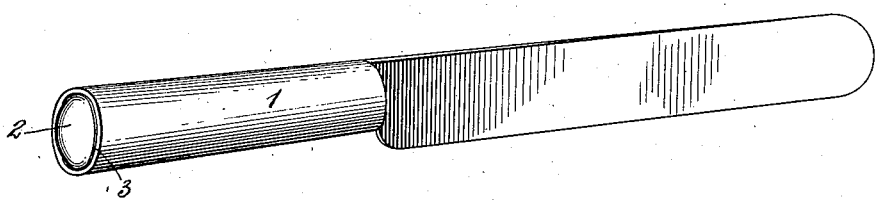
Figure 2:
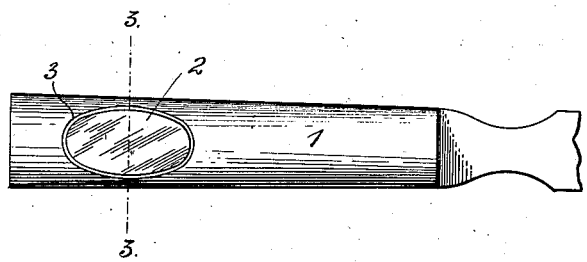
Figure 3:
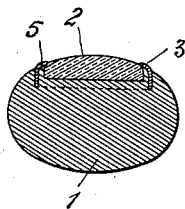

Figure 1 is a perspective view of a knife, showing a mirror mounted in the end of the handle, Fig. 2 is a plan view of a portion of a table implement such as a knife or fork, showing the mirror affixed in the side of the handle, Fig. 3 is a transverse section taken on the line 3—3 of Fig. 2.

As heretofore stated the invention resides particularly in the application of a mirror to a table implement, preferably the handle of such implement.

In Fig. 1 a knife handle 1 of a form commonly employed is shown, the end of such handle being provided with a countersink in which a mirror 2 is mounted. This mirror 2 may be of any suitable shape, such as circular, oval, rectangular, diamond shape, or other form which the manufacturer may desire. It is preferably mounted in the countersink in the end of the handle so that the outer face thereof is flush with the end face of the handle, and where it is placed in the end of a handle made of wood or similar fibrous material, the mirror is preferably held in place by means of a securing ring 3 flanged around its outer edge to engage with the edge or periphery of the mirror, and firmly seated in the end of the handle to hold the mirror. This securing ring is driven into the end of the handle, or a seat may be formed therefor and the ring secured by any desirable means, the ring being of a diameter slightly larger than the diameter of the seat or countersink that receives the mirror, as by this means it may be driven into the end of the handle around the mirror, and inclose a thin web of the material from which the handle is made, which lies between such securing ring and the periphery of the mirror. This thin web will be forced into engagement with the periphery of the mirror in such construction, and being of a fibrous nature, no danger of breaking the mirror is encountered. If the material from which the handle is formed is of such a nature as to securely hold the ring 3 when driven therein, no fastening means is generally required for the ring, but where the material of the handle is of such a nature that the ring may not be firmly held after being driven into position, fastening means therefor, such as a small pin or screw is employed for securing the ring in position.

In Fig. 2 of the drawings, the same application of the mirror is illustrated, in this instance the mirror 2 being placed in the side face of the handle 1 instead of in the end thereof. The same mode of fastening the mirror in position is employed, and the mirror in this position in the handle may also be of any desired shape.

Where the handle of the implement is of metal, the mirror is generally affixed in the implement in the process of molding the latter.

Having thus fully described my invention, what I claim as new, is:—

1. The combination with the handle of an article of table ware having a mirror receiving recess of a contour corresponding with the contour of the mirror to be received therein, of a mirror securing ring secured to the handle, the said ring being spaced from the edge of the recess to provide an intervening web of handle material between the periphery of the mirror and the inner face of the ring.

2. The combination with the handle of an article of tableware, of a mirror securing ring secured to the handle, said ring having its upper portion formed to engage the edges of the mirror, the lower portion of the ring being spaced from the mirror, a web of the handle material being interposed between the mirror and ring below the contact plane of the mirror and ring to form an interposed support for the mirror, whereby an extended contact of the ring and the edges of the mirror in a direction at right angles to the plane of the mirror will be prevented.

3. The combination with the handle of an article of table-ware, said handle having a mirror-receiving recess, of a mirror securing ring secured in said handle, said ring having its upper portion formed to engage the edges of the mirror, the lower portion of the ring being located without the mirror-receiving recess, whereby a supporting web of the handle material will be interposed between the mirror and ring below the contact plane of the mirror and ring.

4. The combination with the handle of an article of table-ware, said handle having a mirror-receiving recess, of a mirror securing ring secured in said handle, said ring having its upper portion formed to engage the edges of the mirror, the lower portion of the ring being located without the mirror-receiving recess, whereby a supporting web of the handle material will be interposed between the mirror and ring below the contact plane of the mirror and ring, said ring being of a size to project below the bottom plane of the mirror.

In testimony whereof I affix my signature in the presence of two witnesses.

ELMER WALTER.

Witnesses:
A. M. WILSON,
M. E. LOWRY.